(12) United States Patent
Davis

(10) Patent No.: US 12,393,784 B1
(45) Date of Patent: Aug. 19, 2025

(54) MAINTAINING DIALOGUE CONSISTENCY IN NATURAL LANGUAGE MODELS

(71) Applicant: LikeHuman LLC, Las Cruces, NM (US)

(72) Inventor: Mark William Davis, Las Cruces, NM (US)

(73) Assignee: LikeHuman, LLC, Las Cruces, NM (US)

( * ) Notice: Subject to any disclaimer, the term of this patent is extended or adjusted under 35 U.S.C. 154(b) by 361 days.

(21) Appl. No.: 17/585,077

(22) Filed: Jan. 26, 2022

Related U.S. Application Data

(60) Provisional application No. 63/157,482, filed on Mar. 5, 2021.

(51) Int. Cl.
  *G06F 40/35* (2020.01)
  *G10L 15/18* (2013.01)

(52) U.S. Cl.
  CPC .......... *G06F 40/35* (2020.01); *G10L 15/1815* (2013.01)

(58) Field of Classification Search
  CPC .. G06F 16/3344; G06F 16/3329; G06F 40/35; G06F 16/338; G06F 16/9035; G06F 16/63
  See application file for complete search history.

(56) References Cited

U.S. PATENT DOCUMENTS

| | | | |
|---|---|---|---|
| 10,013,654 B1* | 7/2018 | Levy | G06N 3/08 |
| 10,978,056 B1* | 4/2021 | Challa | G06N 5/025 |
| 2016/0110415 A1* | 4/2016 | Clark | G06F 16/24535 707/774 |
| 2017/0053020 A1* | 2/2017 | Brown | G06F 16/3344 |
| 2021/0350209 A1* | 11/2021 | Wang | G06F 16/63 |
| 2021/0375280 A1* | 12/2021 | Wang | G10L 15/063 |
| 2022/0179848 A1* | 6/2022 | Tran | G06F 40/35 |

\* cited by examiner

*Primary Examiner* — Mark Villena
(74) *Attorney, Agent, or Firm* — Patterson + Sheridan, LLP

(57) ABSTRACT

In an embodiment, a method includes receiving a query in a natural language dialogue and submitting first information related to the query to at least one response-routing machine learning model that is trained to evaluate an appropriateness of a set of query response modules. The method also includes selecting a plurality of query response modules from the set of query response modules and routing second information related to the query to the plurality of query response modules. The method also includes receiving a plurality of response candidates responsive to the routing. The method also includes retrieving a plurality of dialogue history candidates from a stored record of dialogue events in the natural language dialogue. The method also includes selecting a response from the plurality of response candidates based, at least in part, on the plurality of dialogue history candidates.

20 Claims, 4 Drawing Sheets

MAINTAINING DIALOGUE CONSISTENCY IN NATURAL LANGUAGE MODELS

CROSS-REFERENCE TO RELATED APPLICATIONS

This patent application claims priority to U.S. Provisional Application No. 63/157,482 filed on Mar. 5, 2021. U.S. Provisional Application No. 63/157,482 is hereby incorporated by reference.

BACKGROUND

Technical Field

The present disclosure relates generally to natural language processing and more particularly, but not by way of limitation, to systems and methods of maintaining dialogue consistency in natural language models.

History of Related Art

Natural language systems currently use a range of methods to process requests from human interlocutors. However, responses to such requests are often unproductive and not relevant to the conversation.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, a method of maintaining consistency in natural language dialogues is performed by a computer system. The method includes receiving a query in a natural language dialogue involving a plurality of participants, where the plurality of participants include a human participant and a non-human participant. The query originates from the human participant. The method also includes submitting first information related to the query to at least one response-routing machine learning (ML) model, where the at least one response-routing ML model is trained to evaluate an appropriateness of each of a set of query response modules based, at least in part, on the first information related to the query. The method also includes selecting a plurality of query response modules from the set of query response modules based, at least in part, on a result of the submitting. The method also includes routing second information related to the query to the plurality of query response modules. The method also includes receiving a plurality of response candidates from the plurality of query response modules responsive to the routing. The method also includes retrieving a plurality of dialogue history candidates from a stored record of dialogue events in the natural language dialogue. The method also includes selecting a response from the plurality of response candidates based, at least in part, on the plurality of dialogue history candidates. Other embodiments of this aspect include corresponding computer systems, apparatus, and computer programs recorded on one or more computer storage devices, each configured to perform the actions of the methods.

In an embodiment, a computer system includes a processor and memory. The processor and the memory in combination are operable to implement a method. The method includes receiving a query in a natural language dialogue involving a plurality of participants, where the plurality of participants include a human participant and a non-human participant. The query originates from the human participant. The method also includes submitting first information related to the query to at least one response-routing machine learning (ML) model, where the at least one response-routing ML model is trained to evaluate an appropriateness of each of a set of query response modules based, at least in part, on the first information related to the query. The method also includes selecting a plurality of query response modules from the set of query response modules based, at least in part, on a result of the submitting. The method also includes routing second information related to the query to the plurality of query response modules. The method also includes receiving a plurality of response candidates from the plurality of query response modules responsive to the routing. The method also includes retrieving a plurality of dialogue history candidates from a stored record of dialogue events in the natural language dialogue. The method also includes selecting a response from the plurality of response candidates based, at least in part, on the plurality of dialogue history candidates.

In an embodiment, a computer-program product includes a non-transitory computer-usable medium having computer-readable program code embodied therein. The computer-readable program code is adapted to be executed to implement a method. The method includes receiving a query in a natural language dialogue involving a plurality of participants, where the plurality of participants include a human participant and a non-human participant. The query originates from the human participant. The method also includes submitting first information related to the query to at least one response-routing machine learning (ML) model, where the at least one response-routing ML model is trained to evaluate an appropriateness of each of a set of query response modules based, at least in part, on the first information related to the query. The method also includes selecting a plurality of query response modules from the set of query response modules based, at least in part, on a result of the submitting. The method also includes routing second information related to the query to the plurality of query response modules. The method also includes receiving a plurality of response candidates from the plurality of query response modules responsive to the routing. The method also includes retrieving a plurality of dialogue history candidates from a stored record of dialogue events in the natural language dialogue. The method also includes selecting a response from the plurality of response candidates based, at least in part, on the plurality of dialogue history candidates.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
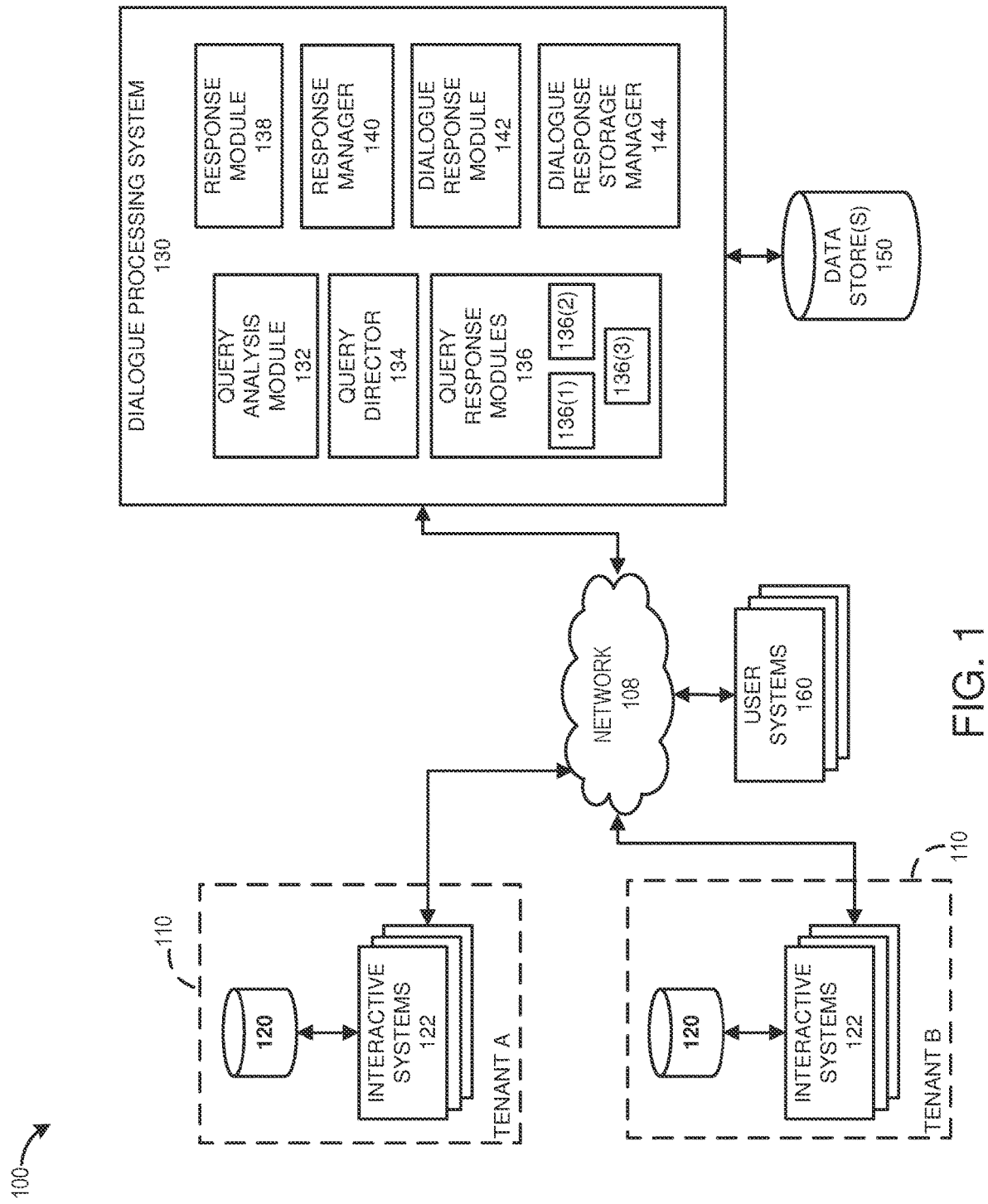
FIG. 1 illustrates an example of a system for implementing a dialogue processing system.

Current natural language systems use a range of methods to process requests from human interlocutors, including deep learning neural networks, generative language models, knowledge representations, parsers, language generation systems, and other approaches. When simulating natural language dialogue between a human being and a system, it is important that the system incorporates the state of previous queries and statements when making decisions about how to respond to new dialogue acts. Some approaches to this include recursive neural network systems that feed their outputs into a part of the input. Knowledge representation approaches use frames or similar state systems to hold the history of the dialogue and the important knowledge referents, thus allowing modification of future discourse actions.

The present disclosure describes examples of systems and methods for maintaining dialogue consistency in natural language models. In a typical embodiment, a natural language dialogue can be viewed as a progression of dialogue events, where each dialogue event is a discrete communication from a participant in the dialogue. Certain events may be referred to as queries or responses. In general, a query represents a dialogue event that is processed for possible generation of a response thereto. In similar fashion, in general, a response is a dialogue event that is responsive to a query.

In one embodiment, a natural language module analyzes the input of a human user to a computational or interactive system. The response of the system to the input request, along with portions of the analysis performed by the system, are temporarily recorded in a secondary storage system. Additional analysis tokens are added to the tokens or words representing the response of the system to this stored representation. The tokens added to the representation include tokens that indicate agent goals, the temporal sequence of statements, or outcomes of the previous responses. As new inputs are received, a similarity measure or machine learning (ML) algorithm is used to rank the stored responses that were accumulated in the earlier interchanges along with new responses from the knowledge store of the system. When stored responses exceed a calculated threshold, the added tokens are used to retrieve new responses relevant to those tokens. By using these methods, the system can maintain dialogue consistency for the system user. In another embodiment, the language input is in the form of a hinted transcription from an automatic speech recognition system. In another embodiment, previous input language events modify the routing of new dialogue statements to language modules by changing the weights or probabilities of language events within the hierarchy of language processing modules. In another embodiment, the input language event is annotated with parts-of-speech or other grammatical markers that provide additional hints and context for the decision process. In another embodiment, the previous responses receive additional tokens that reflect the emotional state of the dialogue participant. In another embodiment, a ML algorithm is trained to retrieve the stored responses based on features of the input request.

FIG. 1 illustrates an example of a system 100 for implementing a dialogue processing system 130 for maintaining dialogue consistency in natural language models. In various embodiments, the dialogue processing system 130 automatically provides dialogue consistency in dialogues performed via interactive systems. The system 100 includes the dialogue processing system 130, tenant systems 110, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the dialogue processing system 130 can centrally manage dialogue processing for its tenants. In particular, in the system 100, the tenant systems 110 can be served by the dialogue processing system 130. In general, the tenant systems 110 can each be considered an abstraction of interactive systems that execute dialogues managed by the dialogue processing system 130, as well as the data sources and users associated with such systems. For example, one of the tenant systems 110 is shown as being owned or operated by "Tenant A" while another system 110 is shown as being owned or operated by a different tenant, "Tenant B." The tenant systems 110 shown can be owned or operated by the same or different entities. For example, Tenants A and B can represent customers (e.g., entities such as companies or individuals) of an operator of the dialogue processing system 130. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more interactive systems 122 and one or more data sources 120. The interactive systems 122 can include a plurality of different communication systems and channels via which users and computer systems can interact to create and maintain dialogues. In various embodiments, the interactive systems 122 can facilitate, for example, voice communication (e.g., voice dialogues), textual communication (e.g., chat dialogues), combinations of the foregoing and/or the like. The dialogues can represent, for example, two-way or multi-way conversations involving any number of human and/or non-human participants. In certain embodiments, the interactive systems 122 of each of the tenant systems 110 can be participants in the dialogues created and maintained thereby, with the dialogue processing system 130 facilitating such participation with recommended responses as described in greater detail below. In various embodiments, the interactive systems 122 can be, or include, games, user support systems, or any other application or service involving interaction.

In the illustrated embodiment, the dialogue processing system 130 can include a query analysis module 132, a query director 134, query response modules 136, a response module 138, a response manager 140, a dialogue response module 142, and a dialogue response storage manager 144. Each of these components can be implemented with hardware and/or software, including (optionally) virtual machines and containers. In an example, the dialogue processing system 130 can be implemented as a single management server. In another example, the dialogue processing system 130 can be implemented in a plurality of virtual or physical servers, which may or may not be geographically co-located. In some embodiments, the dialogue processing system 130 and/or other aspects of the system 100 may be hosted in a cloud.

In certain embodiments, features of the components of the dialogue processing system 130 and/or the interactive systems 122 of each of the tenant systems 110 can be made accessible over an interface to the user systems 160. The user systems 160 can include any type of computing device, including desktops, laptops, tablets, smartphones, and wearables, to name a few. In this way, the user systems 160 can be operated by users of the interactive systems 122, or by administrators or super users, for example, for administration purposes.

In a typical embodiment, the dialogue processing system 130 can operate independent dialogue processing, in parallel, for each distinct natural language dialogue. In this fashion, queries can each be processed in light of the natural language dialogue to which they relate, with automated responses being produced by the dialogue processing system 130 in a manner consistent with that dialogue. Further, in various embodiments, operation of the dialogue processing system 130 can differ for each of the tenant systems 110 and/or for each of the interactive systems 122 of each of the tenant systems 110. For simplicity of description, operation of the components of the dialogue processing system 130 will be described relative to singular queries.

The query analysis module 132 can receive, from any of the interactive systems 122, queries in a natural language dialogue. Upon receipt of a query, the query analysis module 132 can perform an initial query analysis that can include, for example, tokenizing the query by breaking the query into a series of tokens, and annotating the tokens with various features. These various features may include, for example, case-normalized versions of the tokens, parts-of-speech indicators, grammar identifiers, knowledge representation indicators, other linguistic properties, combinations of the foregoing and/or the like. The knowledge representation indicators, if any, can include references to a given token's meaning in a knowledge representation such as an ontology, onomasticon, and/or gazetteer. The series of tokens from the query can also be annotated by a grammar analysis module that provides a grammatical tree representation. Additional annotations may include weights for various aforementioned linguistic elements. In various embodiments, the query analysis module 132 can submit the query and/or information related to the query, such as the annotated series of tokens, to the query director 134.

In some embodiments, the query analysis module 132 can further weight the tokens with domain-specific weighting. In some domains (e.g., for some types of interactive systems), tokens annotated with an emotional state could be configurably provided a relatively higher weight than other tokens. In another example, words deemed less significant in a given domain could be configurably provided a relatively lower weight than other tokens. In various embodiments, the domain-specific weighting can be guided by one or more trained ML models. The weights can be included, for example, as annotations to the series of tokens.

The query director 134 can include logic for selectively routing a query, or information related to a query, to one or more of the query response modules 136. In typical embodiment, the query director 134 includes, or is configured with, one or more response-routing ML models, where the response-routing ML models are each configured to use the query, or the information related to the query (e.g., annotated tokens as discussed above), to evaluate an appropriateness or suitability of each of the query response modules 136 for use in responding to the query. The response-routing ML models can include, for example, artificial neural networks, deep learning neural networks, support vector machines, K nearest neighbor models, naïve Bayesian models, decision trees and forests, or other methods that involve generating a similarity score to a history of data exposures by the model.

For example, in various embodiments, the query director 134, via its response-routing ML models, can score each of the query response modules 136 based on their individual appropriateness or suitability for producing responses the query. In a typical embodiment, the query director 134, via its response-routing ML models, has been trained to route queries to appropriate response modules, not to generate a response itself. In certain embodiments, each response-routing ML model of the query director 134 has been optimized to detect features that indicate a given query's tokens require a specific kind of a response. In an example, a factual query to an electronic customer service system that requests a customer's current balance may require a factual answer based on accessing customer account records. In another example, a query concerning available products may require a factual answer based on a product database. In yet another example, a query in an immersive entertainment system or video game may require accessing a designed model about an automated character's goals in traveling from one destination to another. As further examples, additional types of response modules may include affect-based or emotion-based responses or legal compliance modules. Other types of response modules are possible given a plurality of system requirements.

In a typical embodiment, the query director 134 selects one or more of the query response modules 136 based, at least in part, on its evaluation via the response-routing ML models, and then routes the query or information related to the query (e.g., an annotated series of tokens as discussed above) to the selected modules. For example, the query director 134 can select, and route to, the response module of the query response modules 136 that has the highest score. In another example, the query director 134 can select, and route to, those response modules of the query response modules 136 having the highest N scores. In still another example, the query director 134 can select, and route to, those response modules of the query response modules 136 having scores of at least a threshold value. Other selection logic will be apparent to one skilled in the art after a detailed review of the present disclosure.

In a typical embodiment, the query response modules 136 are each operable to receive information related to a query (e.g., an annotated series of tokens as discussed above) and to provide a response of a different type, with each response module generally using and being configured with a different trained ML model and/or datastore (e.g., factual datastore). For example, with reference to the different types of queries discussed above relative to the query director 134, each type of query that can be detected may correspond to a different response module of the query response modules 136. For example, various of the query response modules 136 may be suited, for example, to produce responses that are factual, discourse-relevant, or even deceptive.

The query response modules 136 can include, for example, artificial neural networks, deep learning neural networks, support vector machines, K nearest neighbor models, naïve Bayesian models, decision trees and forests, or other methods that involve generating a similarity score to a history of data exposures by the model. The query response modules 136 are shown to include a query response module 136(1), a query response module 136(2), and a query response module 136(3). It should be appreciated that three query response modules are shown among the query response modules 136 only for illustrative purposes. In various implementations, any number of query response modules can be included among the query response modules 136.

In certain embodiments, the query response modules 136 are each configured to retrieve response candidates using the trained model and/or datastore (e.g., factual datastore) for that module. The response candidates can be received by the query director 134 and passed to the response manager 140 for further handling in a manner consistent with a corresponding natural language dialogue. In a typical embodiment, the natural language dialogue is represented in a stored record of dialogue events in the one or more data stores 150, with each query and response, for example, being represented as an event in the dialogue.

In general, the response manager 140, the dialogue response module 142, and the dialogue response storage manager 144 collaborate to produce a response to the query in accordance with the corresponding natural language dialogue. In a typical embodiment, the response manager 140 requests, from the dialogue response module 142, top matching dialogue history candidates from the corresponding natural language dialogue. The top matching dialogue history candidates generally represent those dialogue events in the natural language dialogue that are most similar to the query. In certain embodiments, the dialogue response storage manager 144 maintains the natural language dialogue and serves as a point of access for the same. In these embodiments, the dialogue response storage manager 144 can retrieve the dialogue events of the natural language dialogue via the dialogue response storage manager 144 and then rank the dialogue events based on similarity to the query, with the highest ranked dialogue events being presented, for example, as the top matching dialogue history candidates (e.g., as a top-N list). In some embodiments, the dialogue response module 142 uses a trained ML model to identify recent dialogue events. The response manager 140 can compare the top matching dialogue history candidates to the response candidates produced by the query response modules 136.

The response module 138 can include logic for configurably causing a response to be produced in the natural language dialogue and to be recorded as such. In some embodiments, the response is recorded by the dialogue response storage manager 144 in the natural language dialogue before such response is presented, for example, to a user in a given interactive system of the interactive systems 122. In some cases, the response module 138 can decide to produce no response. Operation of the dialogue processing system 130 will be described in greater detail relative to FIGS. 2 and 3.

In some embodiments, the response module 138 can further annotate the response with additional tokens. For instance, a response that is determined by a trained model to indicate a response to an angry query, for example, based on threats or other linguistic token sets in the query, can be annotated with a token that indicates anger. Such tokens may be represented by an offset character or characters for lookup purposes and internal processing. For example, "_ANGRY_" may be added to the annotated token set for the response before the response is issued and recorded. In various embodiments, the presence of these additional tokens can change the way future responses in the natural language dialogue or generated. In various cases, many such tokens may be used to annotate such responses. In some embodiments, such tokens are maintained as a separate priority queue and attached to language events. In certain cases, this feature supports easily determining a current perspective of a given query response module. Further, in some embodiments, such tokens representing dialogue state are used to fine-tune ML models used in the dialogue processing system 130.

In general, the one or more data stores 150 can include any information collected, stored or used by the dialogue processing system 130. For example, in various embodiments, the one or more data stores 150 can include natural language dialogues, dialogue processing settings (e.g., on a tenant-specific basis), combinations of the same and/or the like. In certain embodiments, data stored in the one or more data stores 150 can take the form of repositories, flat files, databases, etc.

Figure 2:
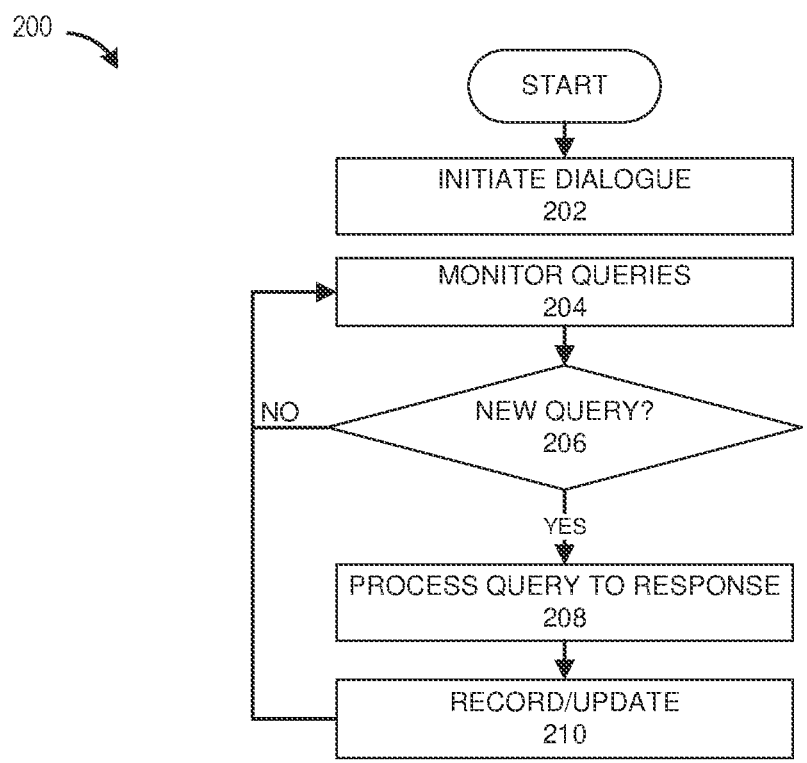
FIG. 2 illustrates an example of a process for maintaining dialogue consistency.

FIG. 2 illustrates an example of a process 200 for maintaining dialogue consistency. In certain embodiments, the process 200 can be implemented by any system that can process data. Although any number of systems, in whole or in part, can implement the process 200, to simplify discussion, the process 200 will be described in relation to particular components shown and described relative to FIG. 1.

At block 202, the dialogue processing system 130 initiates a natural language dialogue for a given interactive system of a given tenant system of the tenant systems 110. The given interactive system can be, for example, one of the interactive systems 122 shown and described relative to FIG. 1. In certain embodiments, the block 202 can involve creating a new dialogue for storage and maintenance by the dialogue response storage manager 144. In various embodiments, the dialogue can have one or more human participants and one or more non-human participants. The given interactive system can serve, for example, as a non-human participant. According to the example of FIG. 2., the dialogue processing system 130 can provide responses as a service to the given interactive system, such that the given interactive system can be used by the given interactive system in its capacity as a non-human participant in the dialogue. In various embodiments, the dialogue can be maintained as a dialogue event history as described previously.

At block 204, the dialogue processing system 130 monitors the dialogue for new queries from participants such as, for example, the one or more human participants. At decision block 206, the dialogue processing system 130 determines whether a new query has been detected in the dialogue. If not, the process 200 returns to the block 204 and executes as described previously. Otherwise, if it is determined at the decision block 206 that a new query has been detected in the dialogue, the process proceeds to block 208.

At block 208, the dialogue processing system 130 processes the query to a response. Example functionality that can be performed at the block 208 will be described relative to FIG. 3. At block 210, the dialogue processing system 130 records the response and/or updates the dialogue with the response. In various embodiments, block 210 can include updating the dialogue with the response as well as with any tokens and/or annotated tokens associated with the query. In some cases, the block 208 can result in a determination to provide no response. In such cases, the block 210 can be omitted. From block 210, the process 200 returns to the block 204 and executes as described previously. In various embodiments, the process 200 can terminate when the given interactive system indicates that the dialogue has ended, upon receipt of a stop command from an administrator or other user, or whenever other suitable stop criteria is satisfied.

Figure 3:
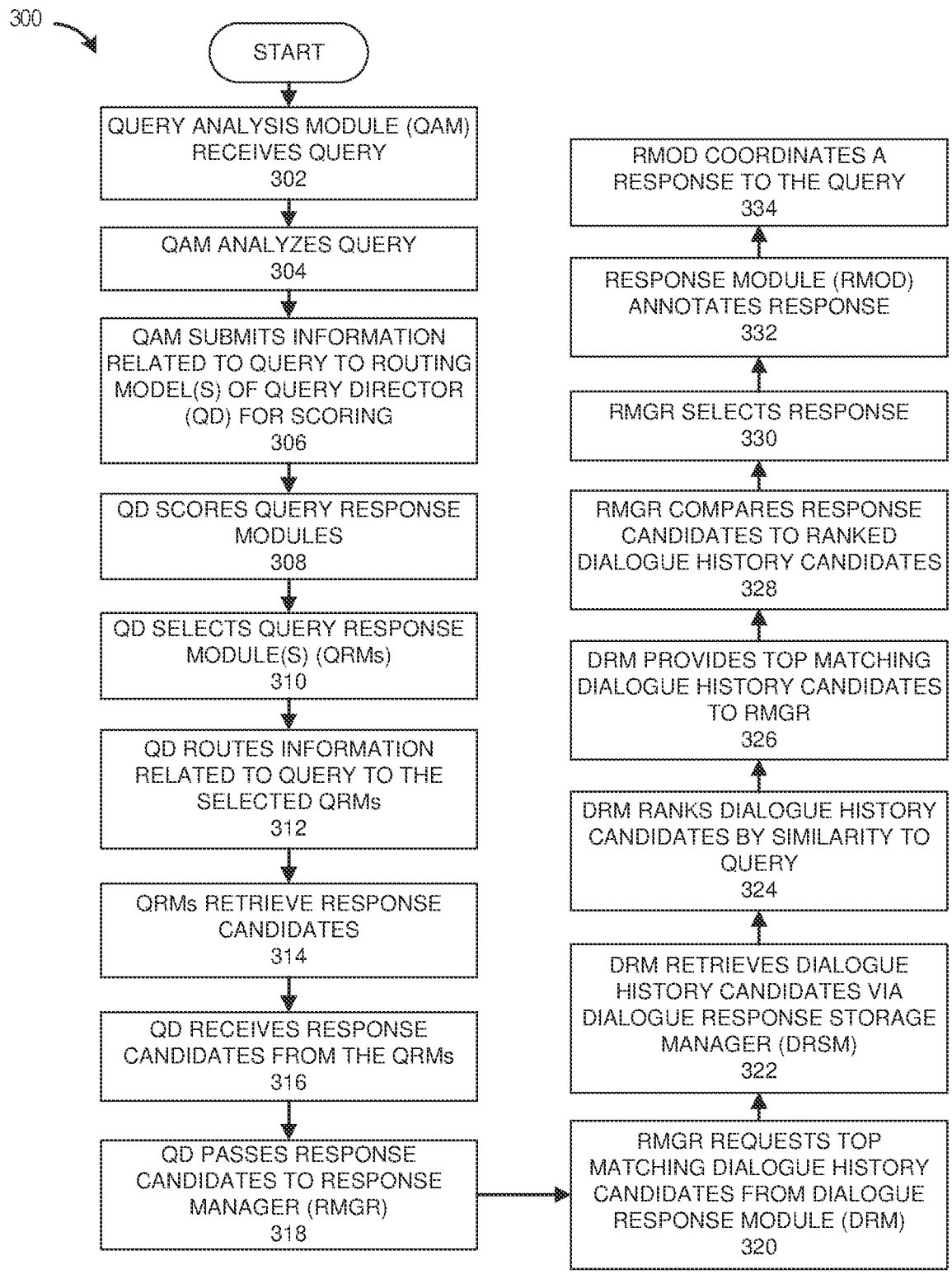
FIG. 3 illustrates an example of a process for processing a query to a response.

FIG. 3 illustrates an example of a process 300 for processing a query to a response. In certain embodiments, the process 300 can be performed as all or part of the block 208 of FIG. 2. In certain embodiments, the process 300 can be implemented by any system that can process data. Although any number of systems, in whole or in part, can implement the process 300, to simplify discussion, the process 300 will be described in relation to particular components shown and described relative to FIG. 1.

At block 302, the query analysis module 132 receives a query for processing. The query can be received in any suitable fashion. For example, the query can be received from one of the interactive systems 122 of one of the tenant systems 110. In various embodiments, the query is part of an ongoing natural language dialogue involving a plurality of participants, which participants may be a combination of human and non-human participants. In a typical embodiment, the query for processing originates from a human participant, although that need not be the case. The interactive system from which the query is received, potentially in combination with the dialogue processing system 130, may be considered a non-human participant in the natural language dialogue.

At block 304, the query analysis module 132 analyzes language of the query. In general, the block 304 can include the query analysis module 132 performing any of the analysis functionality described above relative to FIG. 1. For example, the query analysis module 132 can break the query into a series of tokens and annotate the tokens with features such as case-normalized versions of the tokens, parts-of-speech indicators, grammar identifiers, knowledge representation indicators, other linguistic properties, combinations of the foregoing and/or the like. In some embodiments, the analysis performed by the query analysis module 132 can include performing domain-specific weighting as described relative to FIG. 1.

At block 306, the query analysis module 132 submits information related to the query to the response-routing model(s) of the query director 134 for scoring and routing. The submitted information can include, for example, the annotated series of tokens and/or other information resulting from the analysis performed by the query analysis module 132.

At block 308, the query director 134, via its response-routing ML model(s), scores each of the query response modules 136 based on their individual appropriateness or suitability for producing responses to the query. For example, the query director 134 can use the annotated series of tokens to evaluate an appropriateness or suitability of each of the query response modules. As discussed previously, the query director 134 can score the query response modules 136 using response-routing ML models that can include, for example, artificial neural networks, deep learning neural networks, support vector machines, K nearest neighbor models, naïve Bayesian models, decision trees and forests, or other methods that involve generating a similarity score to a history of data exposures by the model.

At block 310, the query director 134 selects one or more of the query response modules 136 based, at least in part, on the scoring performed at the block 308. For example, the query director 134 can select the response module of the query response modules 136 that has the highest score. In another example, the query director 134 can select those response modules of the query response modules 136 having the highest N scores. In still another example, the query director 134 can select those response modules of the query response modules 136 having scores of at least a threshold value. Other selection logic will be apparent to one skilled in the art after a detailed review of the present disclosure.

At block 312, the query director 134 routes information related to the selected one or more of the query response modules 136 from the block 310. The information can include, for example, the annotated series of tokens for the query and/or other information. At block 314, the selected one or more of the query response modules 136 each retrieve one or more response candidates from, or using, the trained model and/or datastore with which the module is configured.

At block 316, the query director 134 receives the response candidates from the selected one or more of the query response modules 136. At block 318, the query director 134 passes the response candidates to the response manager 140. At block 320, the response manager 140 requests top matching dialogue history candidates from the dialogue response module 142.

At block 322, the dialogue response module 142 retrieves dialogue history candidates from a stored record of dialogue events in the natural language dialogue. In some embodiments, the retrieved dialogue history candidates can represent all dialogue events in the natural language dialogue, most recent events in the natural language dialogue as measured by any configurable time interval, combinations of the foregoing, and/or the like. In some cases, such as when there are no previous dialogue events in the natural language dialogue, blocks 322-328 may be omitted and a response may be selected at block 330 using either a default option or other logic that is not dependent upon previous dialogue events.

At block 324, the dialogue response module 142 ranks the retrieved dialogue history candidates by similarity to the query. For example, the dialogue response module 142 can rank the dialogue history candidates by similarity of the tokens thereof to the annotated tokens of the query. In general, similarity can be determined in any suitable fashion to derive a value representative of a given candidate's similarity to the query. For example, the ranking can be calculated based upon token overlap, semantic similarity, annotation similarity, combinations of the foregoing and/or the like.

At block 326, the dialogue response module 142 provides the top matching dialogue history candidates to the response manager 140. In some embodiments, the top matching dialogue history candidates can include all of the ranked dialogue history candidates. In other embodiments, the top matching dialogue history candidates can represent a filtered subset of the ranked dialogue history candidates such as, for example, a top-N list.

At block 328, the response manager 140 compares the response candidates to the top matching dialogue history candidates. In various embodiments, the block 328 can involve determining similarity of the response candidates to the top matching dialogue history candidates in any of the ways discussed above relative to the block 324. Additionally, in certain embodiments, the block 328 can result in a ranked list of responses in similar fashion to the ranking described relative to the block 324, such that highest ranked responses represent those responses that are determined to be most similar to the top matching dialogue history candidates.

At block 330, the response manager 140 selects a response from among the response candidates. The selected response can be, for example, a highest ranked response candidate. At block 332, the response manager 140 annotates the response with additional tokens as described relative to FIG. 1. For example, a response that is determined by a trained model to indicate a response to an angry query, for example, based on threats or other linguistic token sets in the query, can be annotated with a token that indicates anger. In some cases, no further annotation may be performed and the block 332 can be omitted.

At block 334, the response module 138 coordinates a response to the query based, at least in part, on the selected response. In various embodiments, the block 334 can involve implementing program logic such as, for example, determining whether to use the response in the natural language dialogue. The program logic can evaluate, for example, whether metrics behind the response's ranking, if applicable, are sufficiently high relative to one or more thresholds. In some cases, if the response is unsuitable, it can be substituted with a different or default response (e.g., "I do not understand"). In other cases, the program logic can provide for a determination of no response (e.g., if configurable criteria is satisfied, such as the response having "_ANGRY_" annotations) or for other functionality such as routing the query to a human respondent. After block 334, the process 300 ends.

Figure 4:
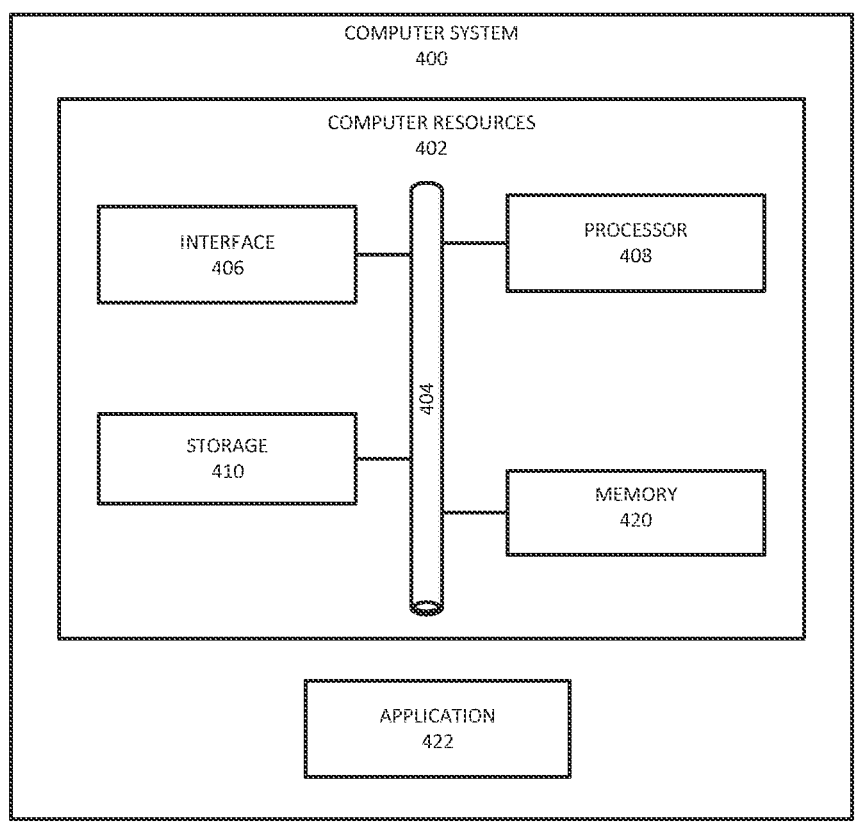
FIG. 4 illustrates an example of a computer system.

FIG. 4 illustrates an example of a computer system 400 that, in some cases, can be representative, for example, of the tenant systems 110, the dialogue processing system 130, the interactive systems 122, the user systems 160 and/or a module or sub-component of the foregoing. The computer system 400 includes an application 422 operable to execute on computer resources 402. The application 422 can be, for example, any of the systems or modules illustrated in FIG. 1. In particular embodiments, the computer system 400 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 400 may comprise any suitable physical form, configuration, number, type and/or layout. As an example, and not by way of limitation, the computer system 400 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 400 may include one or more computer systems; be unitary or distributed; span multiple locations; span multiple machines; or reside in a cloud, which may include one or more cloud components in one or more networks.

In the depicted embodiment, the computer system 400 includes a processor 408, memory 420, storage 410, interface 406, and bus 404. Although a particular computer system is depicted having a particular number of particular components in a particular arrangement, this disclosure contemplates any suitable computer system having any suitable number of any suitable components in any suitable arrangement.

Processor 408 may be a microprocessor, controller, or any other suitable computing device, resource, or combination of hardware, software and/or encoded logic operable to execute, either alone or in conjunction with other components, (e.g., memory 420), the application 422. Such functionality may include providing various features discussed herein. In particular embodiments, processor 408 may include hardware for executing instructions, such as those making up the application 422. As an example, and not by way of limitation, to execute instructions, processor 408 may retrieve (or fetch) instructions from an internal register, an internal cache, memory 420, or storage 410; decode and execute them; and then write one or more results to an internal register, an internal cache, memory 420, or storage 410.

In particular embodiments, processor 408 may include one or more internal caches for data, instructions, or addresses. This disclosure contemplates processor 408 including any suitable number of any suitable internal caches, where appropriate. As an example, and not by way of limitation, processor 408 may include one or more instruction caches, one or more data caches, and one or more translation lookaside buffers (TLBs). Instructions in the instruction caches may be copies of instructions in memory 420 or storage 410 and the instruction caches may speed up retrieval of those instructions by processor 408. Data in the data caches may be copies of data in memory 420 or storage 410 for instructions executing at processor 408 to operate on; the results of previous instructions executed at processor 408 for access by subsequent instructions executing at processor 408, or for writing to memory 420, or storage 410; or other suitable data. The data caches may speed up read or write operations by processor 408. The TLBs may speed up virtual-address translations for processor 408. In particular embodiments, processor 408 may include one or more internal registers for data, instructions, or addresses. Depending on the embodiment, processor 408 may include any suitable number of any suitable internal registers, where appropriate. Where appropriate, processor 408 may include one or more arithmetic logic units (ALUs); be a multi-core processor; include one or more processors 408; or any other suitable processor.

Memory 420 may be any form of volatile or non-volatile memory including, without limitation, magnetic media, optical media, random access memory (RAM), read-only memory (ROM), flash memory, removable media, or any other suitable local or remote memory component or components. In particular embodiments, memory 420 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 420 may include one or more memories 420, where appropriate. Memory 420 may store any suitable data or information utilized by the computer system 400, including software embedded in a computer readable medium, and/or encoded logic incorporated in hardware or otherwise stored (e.g., firmware). In particular embodiments, memory 420 may include main memory for storing instructions for processor 408 to execute or data for processor 408 to operate on. In particular embodiments, one or more memory management units (MMUs) may reside between processor 408 and memory 420 and facilitate accesses to memory 420 requested by processor 408.

As an example, and not by way of limitation, the computer system 400 may load instructions from storage 410 or another source (such as, for example, another computer system) to memory 420. Processor 408 may then load the instructions from memory 420 to an internal register or internal cache. To execute the instructions, processor 408 may retrieve the instructions from the internal register or internal cache and decode them. During or after execution of the instructions, processor 408 may write one or more results (which may be intermediate or final results) to the internal register or internal cache. Processor 408 may then write one or more of those results to memory 420. In particular embodiments, processor 408 may execute only instructions in one or more internal registers or internal caches or in memory 420 (as opposed to storage 410 or elsewhere) and may operate only on data in one or more internal registers or internal caches or in memory 420 (as opposed to storage 410 or elsewhere).

In particular embodiments, storage 410 may include mass storage for data or instructions. As an example, and not by way of limitation, storage 410 may include a hard disk drive (HDD), a floppy disk drive, flash memory, an optical disc, a magneto-optical disc, magnetic tape, or a Universal Serial Bus (USB) drive or a combination of two or more of these. Storage 410 may include removable or non-removable (or fixed) media, where appropriate. Storage 410 may be internal or external to the computer system 400, where appropriate. In particular embodiments, storage 410 may be non-volatile, solid-state memory. In particular embodiments, storage 410 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 410 may take any suitable physical form and may comprise any suitable number or type of storage. Storage 410 may include one or more storage control units facilitating communication between processor 408 and storage 410, where appropriate.

In particular embodiments, interface 406 may include hardware, encoded software, or both providing one or more interfaces for communication (such as, for example, packet-based communication) among any networks, any network devices, and/or any other computer systems. As an example, and not by way of limitation, communication interface 406 may include a network interface controller (NIC) or network adapter for communicating with an Ethernet or other wire-based network and/or a wireless NIC (WNIC) or wireless adapter for communicating with a wireless network.

Depending on the embodiment, interface 406 may be any type of interface suitable for any type of network for which computer system 400 is used. As an example, and not by way of limitation, computer system 400 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 400 may include any suitable interface 406 for any one or more of these networks, where appropriate.

In some embodiments, interface 406 may include one or more interfaces for one or more I/O devices. One or more of these I/O devices may enable communication between a person and the computer system 400. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 406 for them. Where appropriate, interface 406 may include one or more drivers enabling processor 408 to drive one or more of these I/O devices. Interface 406 may include one or more interfaces 406, where appropriate.

Bus 404 may include any combination of hardware, software embedded in a computer readable medium, and/or encoded logic incorporated in hardware or otherwise stored (e.g., firmware) to couple components of the computer system 400 to each other. As an example, and not by way of limitation, bus 404 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 404 may include any number, type, and/or configuration of buses 404, where appropriate. In particular embodiments, one or more buses 404 (which may each include an address bus and a data bus) may couple processor 408 to memory 420. Bus 404 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 408 (such as, for example, one or more internal registers or caches), one or more portions of memory 420, one or more portions of storage 410, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of maintaining consistency in natural language dialogues, the method comprising, by a computer system:
   receiving a query in a natural language dialogue involving a plurality of participants, the plurality of participants comprising a human participant and a non-human participant, the query originating from the human participant;
   analyzing language of the query, the analyzing comprising breaking the query into a plurality of tokens and annotating the plurality of tokens with a plurality of features;
   submitting first information related to the query to at least one response-routing machine learning (ML) model to evaluate an individual appropriateness of each query response module of a set of query response modules for responding to the query, wherein the submitted first information comprises the annotated plurality of tokens, and wherein the at least one response-routing ML model is trained to evaluate the individual appropriateness of each query response module of the set of query response modules for responding to the query based, at least in part, on the annotated plurality of tokens;
   selecting a plurality of query response modules from the set of query response modules based, at least in part, on the evaluated individual appropriateness of each query response module of the set of query response modules;
   routing second information related to the query to the selected plurality of query response modules to produce a plurality of response candidates;
   receiving the plurality of response candidates from the plurality of query response modules responsive to the routing;
   retrieving a plurality of dialogue history candidates from a stored record of dialogue events in the natural language dialogue; and
   selecting a response from the plurality of response candidates based, at least in part, on the plurality of dialogue history candidates.

2. The method of claim 1, wherein the query is received from an interactive system that executes the natural language dialogue, the natural language dialogue comprising a progression of the dialogue events, the dialogue events each comprising a discrete communication from at least one of the plurality of participants.

3. The method of claim 2, wherein, for at least one token of the plurality of tokens, the annotating comprises annotating the at least one token with a reference to a meaning of the at least one token in a knowledge representation.

4. The method of claim 3, wherein the plurality of features are selected from the group consisting of: a case-normalized version of a token, a part-of-speech indicator, a grammar identifier, and a knowledge representation indicator.

5. The method of claim 3, wherein the analyzing comprises weighting at least a portion of the plurality of tokens based on a domain of the interactive system such that at least one token is given a relatively higher weight than at least one other token, wherein the first information submitted to the at least one response-routing ML model comprises the weighted and annotated plurality of tokens.

6. The method of claim 5, wherein the weighting comprises providing at least one token associated with a word deemed less significant in the domain with a relatively lower weight than others of the plurality of tokens.

7. The method of claim 1, comprising:
   scoring the set of query response modules, via the at least one response-routing ML model, based on the evaluated individual appropriateness of each query response module of the set of query response modules; and
   wherein the selecting the plurality of query response modules is based, at least in part, on the scoring.

8. The method of claim 1, comprising:
   ranking the plurality of dialogue history candidates by similarity to the query;
   comparing the plurality of response candidates to at least a portion of the ranked plurality of dialogue history candidates; and wherein the selecting the response is based, at least in part, on the comparing.

9. The method of claim 8, wherein the at least a portion of the ranked plurality of dialogue history candidates comprise a set of top matching dialogue history candidates relative to the query based on the ranking of the plurality of dialogue history candidates.

10. The method of claim 9, wherein the comparing comprises ranking the plurality of response candidates by similarity to the set of top matching dialogue history candidates.

11. The method of claim 10, wherein the selected response comprises a highest ranked response candidate in the plurality of response candidates based on the ranking of the plurality of response candidates.

12. The method of claim 1, comprising determining whether to use the response in the natural language dialogue in accordance with program logic.

13. The method of claim 12, comprising substituting a different response in response to a determination not to use the selected response.

14. The method of claim 1, comprising determining to provide no response to the query if configurable criteria is satisfied.

15. The method of claim 1, wherein the first information related to the query is the same as the second information related to the query.

16. The method of claim 1, wherein each query response module of the set of query response modules is each configured to provide a different type of query response.

17. The method of claim 1, wherein at least a portion of the query response modules of the set of query response modules are each configured with a different trained ML model.

18. The method of claim 1, wherein at least one of the query response modules is a configured with a factual datastore.

19. A computer system comprising a processor and memory, wherein the processor and the memory in combination are operable to implement a method comprising:
    receiving a query in a natural language dialogue involving a plurality of participants, the plurality of participants comprising a human participant and a non-human participant, the query originating from the human participant;
    analyzing language of the query, the analyzing comprising breaking the query into a plurality of tokens and annotating the plurality of tokens with a plurality of features;
    submitting first information related to the query to at least one response-routing machine learning (ML) model to evaluate an individual appropriateness of each query response module of a set of query response modules for responding to the query, wherein the submitted first information comprises the annotated plurality of tokens, and wherein the at least one response-routing ML model is trained to evaluate the individual appropriateness of each query response module of the set of query response modules for responding to the query based, at least in part, on the annotated plurality of tokens;
    selecting a plurality of query response modules from the set of query response modules based, at least in part, on the evaluated individual appropriateness of each query response module of the set of query response modules;
    routing second information related to the query to the selected plurality of query response modules to produce a plurality of response candidates;
    receiving the plurality of response candidates from the plurality of query response modules responsive to the routing;
    retrieving a plurality of dialogue history candidates from a stored record of dialogue events in the natural language dialogue; and
    selecting a response from the plurality of response candidates based, at least in part, on the plurality of dialogue history candidates.

20. A computer-program product comprising a non-transitory computer-usable medium having computer-readable program code embodied therein, the computer-readable program code adapted to be executed to implement a method comprising:
    receiving a query in a natural language dialogue involving a plurality of participants, the plurality of participants comprising a human participant and a non-human participant, the query originating from the human participant;
    analyzing language of the query, the analyzing comprising breaking the query into a plurality of tokens and annotating the plurality of tokens with a plurality of features;
    submitting first information related to the query to at least one response-routing machine learning (ML) model to evaluate an individual appropriateness of each query response module of a set of query response modules for responding to the query, wherein the submitted first information comprises the annotated plurality of tokens, and wherein the at least one response-routing ML model is trained to evaluate the individual appropriateness of each query response module of the set of query response modules for responding to the query based, at least in part, on the annotated plurality of tokens;
    selecting a plurality of query response modules from the set of query response modules based, at least in part, on the evaluated individual appropriateness of each query response module of the set of query response modules;
    routing second information related to the query to the selected plurality of query response modules to produce a plurality of response candidates;
    receiving the plurality of response candidates from the plurality of query response modules responsive to the routing;
    retrieving a plurality of dialogue history candidates from a stored record of dialogue events in the natural language dialogue; and
    selecting a response from the plurality of response candidates based, at least in part, on the plurality of dialogue history candidates.

* * * * *